United States Patent
Lavaur et al.

(10) Patent No.: US 8,449,257 B2
(45) Date of Patent: *May 28, 2013

(54) WIND GENERATOR WITH FOLDING MAST

(75) Inventors: Richard Lavaur, Waterloo (BE); Michel De Vivo, Louveciennes (FR); Alain Ghiretti, Saint Cyr En Val (FR)

(73) Assignee: Alizeo, Paris (FR)

( * ) Notice: Subject to any disclaimer, the term of this patent is extended or adjusted under 35 U.S.C. 154(b) by 557 days.

This patent is subject to a terminal disclaimer.

(21) Appl. No.: 12/667,198

(22) PCT Filed: Jun. 20, 2008

(86) PCT No.: PCT/EP2008/057907
§ 371 (c)(1),
(2), (4) Date: Dec. 29, 2009

(87) PCT Pub. No.: WO2009/003860
PCT Pub. Date: Jan. 8, 2009

(65) Prior Publication Data
US 2010/0181768 A1 Jul. 22, 2010

(30) Foreign Application Priority Data
Jul. 2, 2007 (FR) .................................... 07 04762

(51) Int. Cl.
*F01D 5/00* (2006.01)
(52) U.S. Cl.
USPC .... 416/142; 416/244 A; 416/246; 416/DIG. 6

(58) Field of Classification Search
USPC .............. 416/142, 146 R, 244 R, 244 A, 246, 416/DIG. 6; 52/111, 115, 116, 117, 119, 52/120
See application file for complete search history.

(56) References Cited

U.S. PATENT DOCUMENTS

| | | | | |
|---|---|---|---|---|
| 4,081,081 A | * | 3/1978 | Morrow et al. | 212/178 |
| 4,449,634 A | * | 5/1984 | Buzzichelli et al. | 212/196 |
| 4,590,718 A | * | 5/1986 | Angeloff | 52/116 |
| 4,630,996 A | | 12/1986 | Masaki | |
| 5,572,837 A | * | 11/1996 | Featherstone et al. | 52/118 |
| 7,192,252 B2 | * | 3/2007 | Duguet et al. | 416/142 |
| 2003/0071004 A1 | * | 4/2003 | Higgins | 212/292 |

FOREIGN PATENT DOCUMENTS

| | | |
|---|---|---|
| CA | 2 479 517 | 3/2006 |
| EP | 1 679 282 | 7/2006 |
| ET | 0 033 258 | 8/1981 |
| FR | 2 295 259 | 7/1976 |

(Continued)

OTHER PUBLICATIONS

International Preliminary Report on Patentability dated Jan. 5, 2010 for Application No. PCT/EP2008/057907.
French Search Report dated Mar. 27, 2008 for Application No. FR0704762.

(Continued)

*Primary Examiner* — Edward Look
*Assistant Examiner* — Aaron R Eastman
(74) *Attorney, Agent, or Firm* — Frost Brown Todd LLC

(57) ABSTRACT

Wind generator comprising a folding mast (1) pivotally mounted about an articulation (5) positioned at a location some way between the lower (Ia) and upper (Ib) ends of the mast, a counterweight (19) is movably connected to the lower part of the mast and the wind generator comprises a control device (V2) adapted to move the counterweight so that the center of gravity (G) of the counterweight is moved toward and away from the articulation along the longitudinal axis (A) of the mast.

12 Claims, 10 Drawing Sheets

FOREIGN PATENT DOCUMENTS

| | | |
|---|---|---|
| FR | 2 446 930 | 1/1979 |
| FR | 2 568 948 | 2/1986 |
| FR | 2 861 141 | 10/2003 |
| NL | 7 801 247 | 8/1979 |
| WO | WO 00/36299 | 6/2000 |

OTHER PUBLICATIONS

International Search Report dated Sep. 10, 2008 for Application No. PCT/EP2008/057907.

* cited by examiner

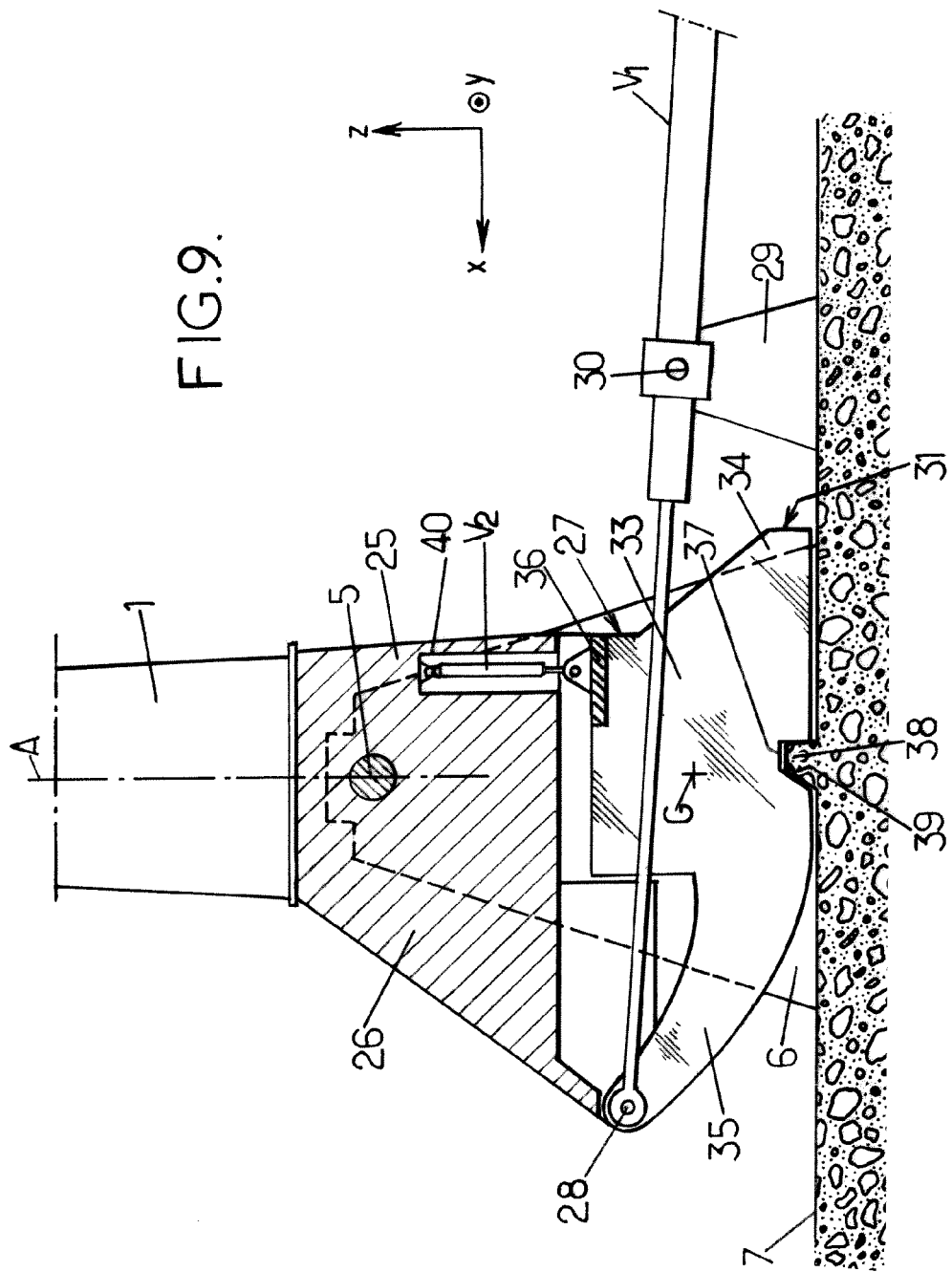

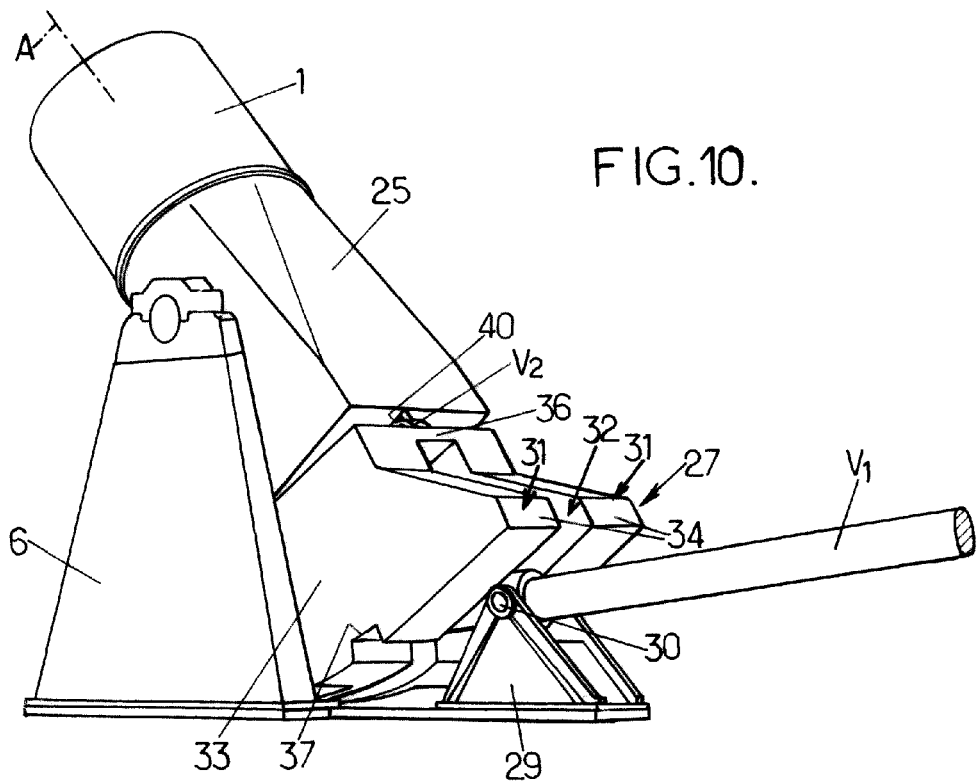
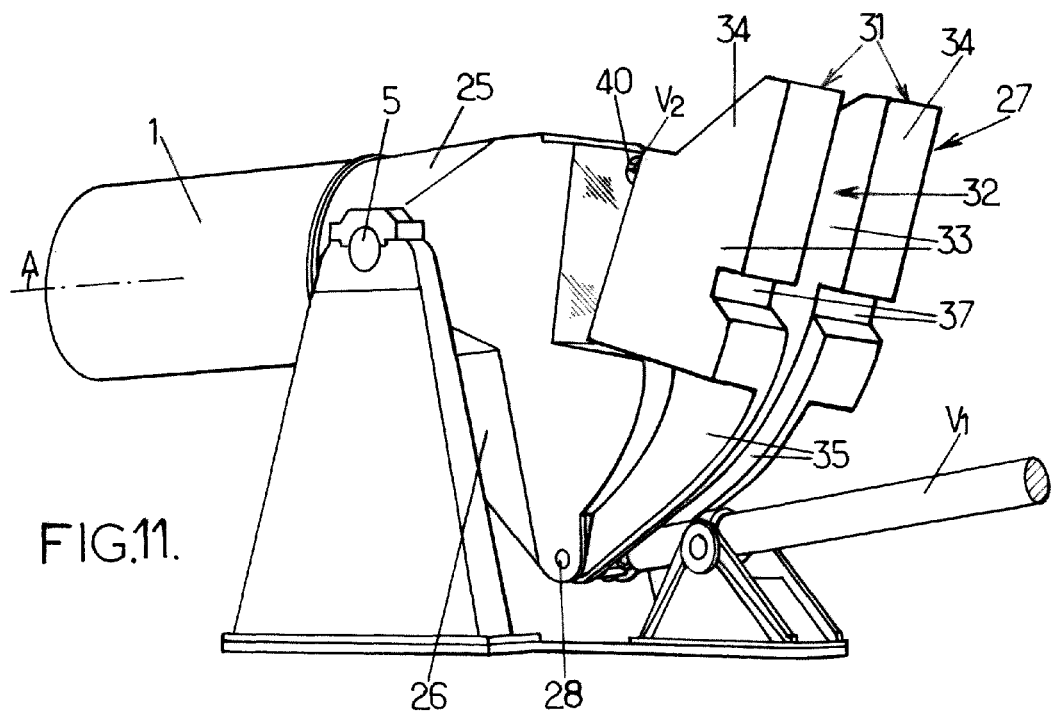

WIND GENERATOR WITH FOLDING MAST

FIELD OF THE INVENTION

The present invention relates to wind generators with folding masts.

More specifically, the invention relates to a wind generator comprising:
- a mast extending along a longitudinal axis between a lower end and an upper end, said mast being connected to the ground by an articulation and pivotally mounted about said articulation between a substantially vertical erect position and a substantially horizontal folded-down position, the articulation being positioned between the lower and upper ends of the mast, the mast comprising a lower part, situated between the articulation and the lower end, which counterweights the nacelle and an upper part of the mast situated between the articulation and the nacelle, a counterweight being movably connected to the lower part of the mast,
- a nacelle borne by the upper end of the mast, this nacelle comprising a rotor bearing a turbine,
- at least one main actuator connected to the mast and adapted to make said mast pivot between the erect position and the folded-down position.

Wind generators of this type can thus be folded down when the wind is strong, particularly in areas prone to cyclones.

The ability to fold the mast is also beneficial in simplifying the initial erection and maintenance of the wind generator.

BACKGROUND OF THE INVENTION

Document WO-A-00/36299 describes a wind generator of this type, the articulation of which is positioned at the lower end of the mast. A wind generator of this type requires a particularly powerful actuator (in this instance a hydraulic ram) which, given the long stroke that a ram such as this needs to have, makes it particularly expensive and technically rather unsuitable and somewhat unreliable.

OBJECTS AND SUMMARY OF THE INVENTION

It is a particular object of the present invention to alleviate this disadvantage.

To this end, according to one aspect of the invention, a wind generator of the kind in question is characterized in that it comprises a control device including at least one additional actuator connecting the moving counterweight to the mast and adapted to move the counterweight so that a center of gravity of the counterweight is moved toward and away from said articulation along the longitudinal axis of the mast.

By virtue of these arrangements, the actuator can be less powerful than in the prior art, and therefore less expensive and more reliable, and this can be achieved without the need for particularly complex arrangements.

In various embodiments of the wind generator according to the invention, recourse may also possibly be had to one and/or other of the following arrangements:
- the control device is adapted to move the counterweight in synchronism with the pivoting of the mast so as to move said center of gravity progressively:
  away from the articulation as the mast is pivoting into the folded-down position,
  and closer to the articulation as the mast is pivoting into the erect position;
- the control device is adapted to move the counterweight as a function of a tilt angle of the mast so as to balance at least partially a torque applied to said mast by gravity during pivoting of the mast;
- the control device is adapted to move the counterweight as a function of an external force applied to the mast by the wind so as to balance at least partially a torque applied to said mast by said external force during pivoting of the mast;
- the counterweight is pivotally mounted at the lower end of the mast;
- the moving counterweight is slidably mounted along the mast;
- the additional actuator is chosen from a hydraulic ram and a winch associated with a cable;
- said counterweight comprises a mass of a dense material chosen from concrete, cast iron, clinker and sand;
- the lower part of the mast has a first height and the upper part of the mast has a second height, the first height ranging between 10% and 50% of the second height, preferably between 15% and 25% of the second height;
- counterweight has a first mass, the upper part of the mast and the nacelle together having a second mass, the first mass ranging between 30% and 300% of the second mass, preferably between 50% and 150% of the second mass;
- the main actuator includes a hydraulic ram;
- the main actuator includes a motor actuating a pinion which meshes with a circular rack centered on the articulation, one of said pinion and rack being connected to the mast;
- the counterweight is adapted to engage with a fixed anchoring device when the mast is in the erect position so as to lock the mast in said erect position, and the control mechanism is adapted to selectively engage and disengage the counterweight from the fixed anchoring device;
- the counterweight is shaped to cooperate by fitting with said anchoring device in a substantially vertical direction.

Besides, according to another aspect, the invention also concerns a wind generator comprising:
- a mast extending between a lower end and an upper end, said mast being connected to the ground by an articulation and pivotally mounted about said articulation between a substantially vertical erect position and a substantially horizontal folded-down position,
- a nacelle borne by the upper end of the mast, this nacelle comprising a rotor bearing a turbine,
- at least one actuator connected to the mast and adapted to make said mast pivot between the erect position and the folded-down position, characterized in that the actuator includes a motor actuating a pinion which meshes with a circular rack centered on the articulation, one of said pinion and rack being connected to the mast. The articulation may be positioned between the lower and upper ends of the mast, the mast thus comprising a lower part, situated between the articulation and the lower end, which counterweights the nacelle and an upper part of the mast situated between the articulation and the nacelle.

Further features and advantages of the invention will become apparent in the course of the following description of four embodiments thereof which are given by way of non limiting examples and with reference to the attached drawings.

BRIEF DESCRIPTION OF THE DRAWINGS

In the drawings:

FIG. 9 is a vertical section of the lower part of the mast of the wind generator of FIGS. 7 and 8;

FIGS. 10 and 11 are perspective views showing the lower part of the mast of the wind generator of FIGS. 7-9, respectively in the process of being folded down and in the folded-down position;

MORE DETAILED DESCRIPTION

In the various figures, the same references denote elements that are identical or similar.

Figure 1:
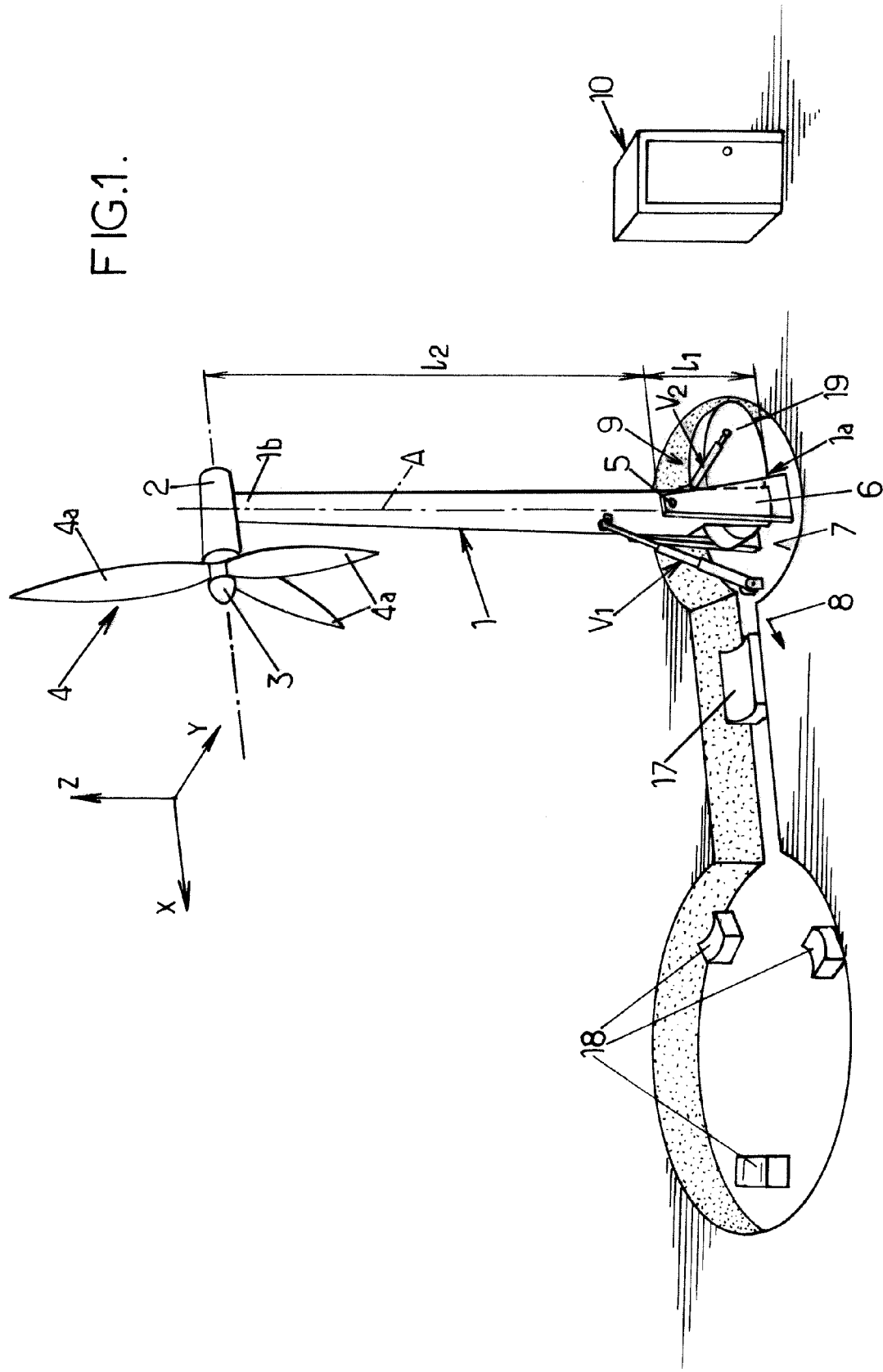
FIG. 1 is a schematic perspective view of a wind generator according to a first embodiment of the invention, with its mast in the erect position.
Figure 2:
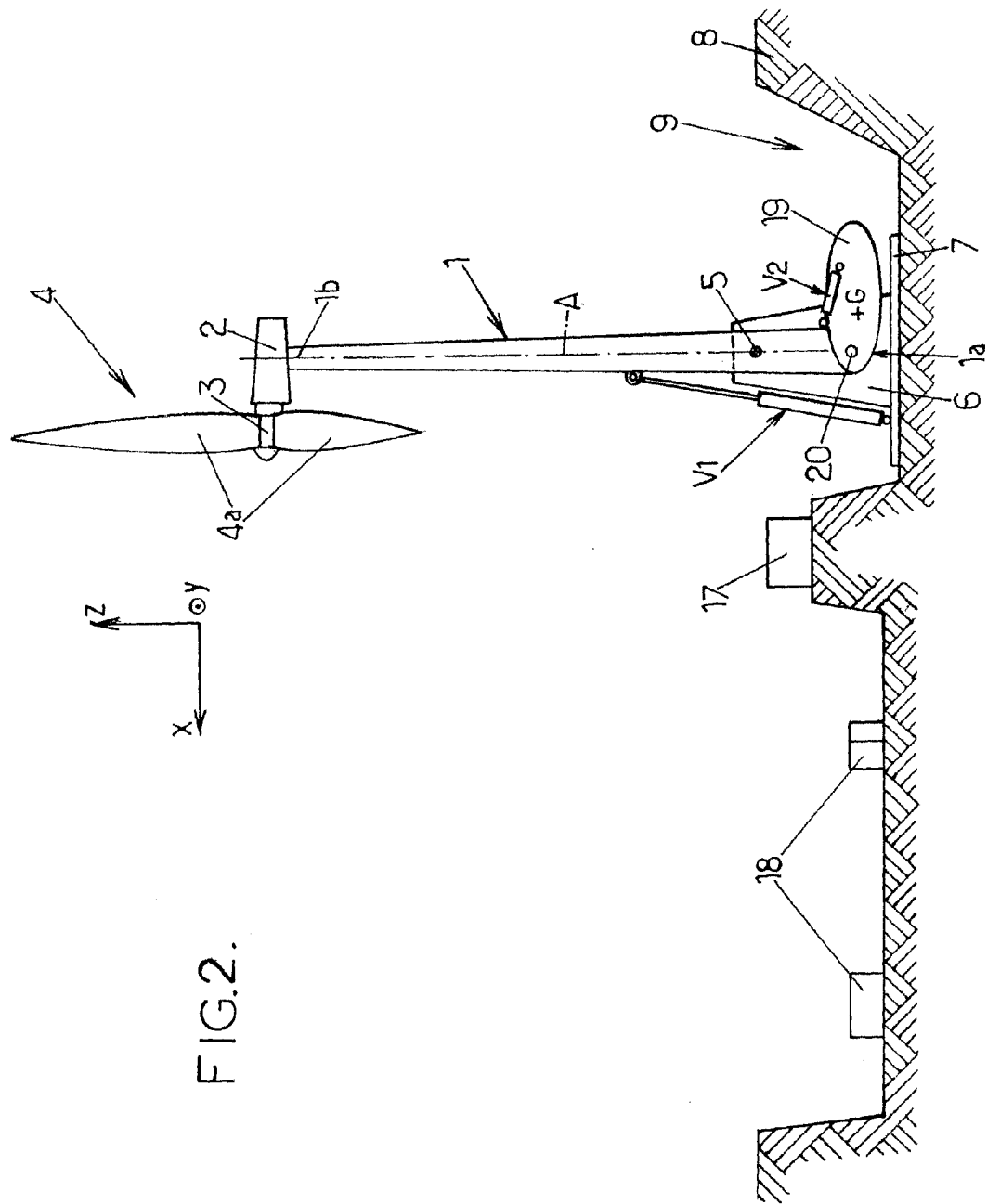
FIG. 2 is an elevation of the wind generator of FIG. 1, in the erect position, one of the mast cheek plates having been omitted for greater clarity.

As depicted in FIGS. 1 and 2, the invention relates to a wind generator comprising:
- a support mast 1 extending between a lower end 1a and an upper end 1b,
- a nacelle 2 pivotally mounted at the upper end of the support mast 1 about a vertical axis Z, the nacelle 2 containing, in particular, an alternator,
- a rotor 3 mounted to rotate about a substantially horizontal axis R and borne by the nacelle 2, the rotor 3 bearing a turbine 4 with several blades 4a which is designed to run the alternator contained in the nacelle 2.

Without implying any limitation, the support mast 1 may extend over a height to about 50 to 100 m and its metallic structure may for example weigh around 50 tons (not including the counterweight mentioned hereinbelow), while the nacelle 2, including the rotor 3 and the turbine 4, may weigh 50 to 70 tons. The support mast 1 may be a hollow mast of, for example, circular or some other cross section, of a width which may be of the order of 3 to 4 m at its bottom.

The mast 1 is pivotally mounted about an articulation 5, for example a simple pivot, which allows the mast 1 to pivot about a horizontal axis Y. The mast 1 can thus pivot in a vertical plane X, Z between the erect position depicted in FIG. 1 and a folded-down position depicted in FIG. 5.

The articulation 5 may connect the mast 1 for example to two vertical cheek plates 6 which are anchored in a support pedestal 7 (or concrete of metal for instance) fixed to the ground 8.

The mast 1 is made to pivot by an actuator V1, for example one or more hydraulic ram(s) which connects/connect the mast 1 to the aforementioned pedestal 7.

Figure 3:
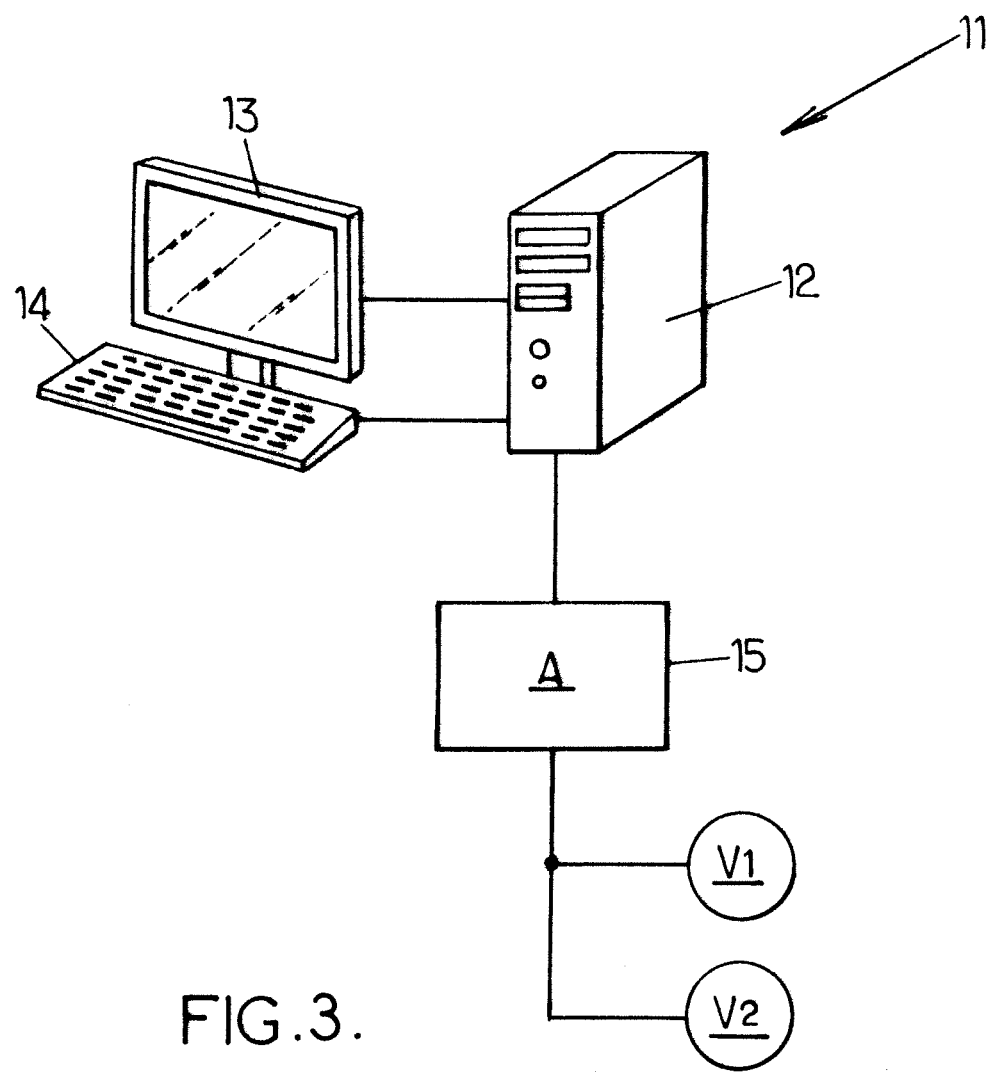
FIG. 3 is a block diagram showing part of the device for controlling the wind generator of FIG. 1.
Figure 4:
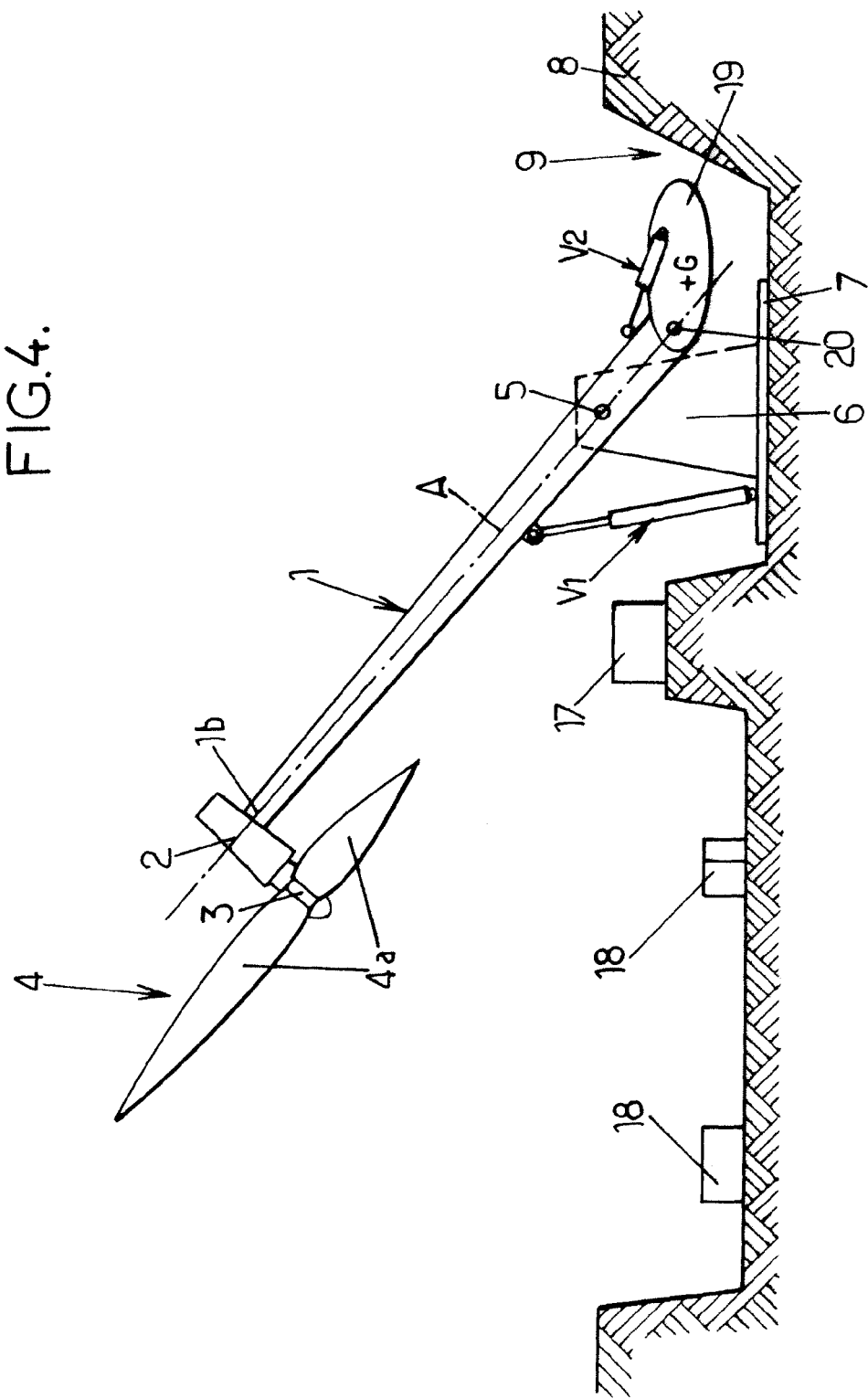
FIGS. 4 and 5 are views similar to FIG. 2 of the wind generator in the process of being folded down and in the folded-down position, respectively.

This ram V1 can be controlled, for example from a control station 10 situated near the wind generator or remotely, by a control device which may in particular, as depicted in FIG. 3, comprise a microcomputer 12 or the like, provided with the customary interfaces such as a screen 13, a keyboard 14 and the like and controlling, for example, a controller 15 (A) which itself controls the ram V1.

The hydraulic part of the control of the ram V1 is not depicted but is well known to those skilled in the art.

As depicted in FIGS. 1 and 2, according to the invention the articulation 5 is positioned at the location some way between the lower 1a and upper 1b ends of the mast 1 such that the lower part of the mast, situated between the articulation 5 and the lower end 1a counterweights the nacelle and the upper part of the mast situated between the articulation 5 and the upper end 1b of the mast. The ratio 11/12 between the height 11 of the lower part of the mast and the height 12 of the upper part of the mast may for example range between 10 and 50% and in particular between 15 and 25%.

The lower part of the mast is preferably weighted with a counterweight 19 based a dense material, for example cast iron, concrete, clinker, sand or the like (when said dense material is a non-cohesive material such as sand or clinker for example, the dense material in question is contained in a rigid casing made of steel or the like). The counterweight 19 may for example have a mass ranging between 30 and 300 tons according to the situation, namely approximately 30 to 300% of the mass of the upper part of the mast and of the nacelle 2, or preferably approximately 50 to 150% of this mass represented by the upper part of the mast 1 and the nacelle 2.

In the first embodiment of the invention (FIGS. 1-5), the counterweight 19 is a moving counterweight, the center of gravity G of which can be positioned a variable distance from the articulation 5. In the particular example depicted, the moving counterweight 19 is pivotally mounted about an articulation 20 at the lower end 1a of the mast 1.

Figure 5:
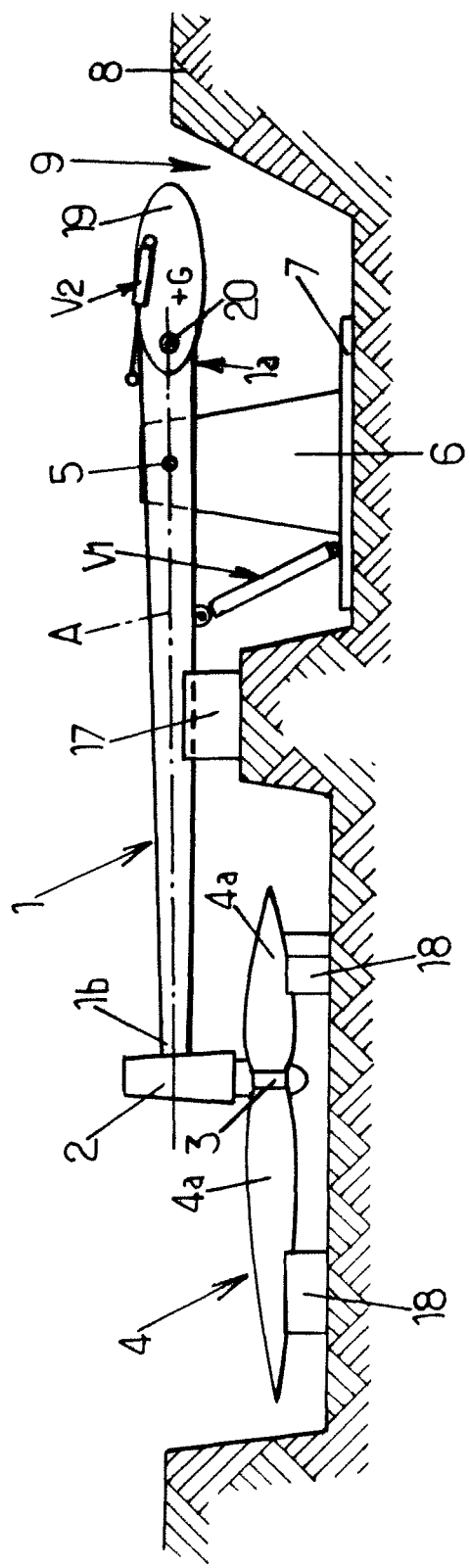

The moving counterweight 19 here has an elongate, for example ovalized, shape, and can be pivoted, between:
- the position depicted in FIG. 2 in which said moving counterweight has its longitudinal axis substantially perpendicular to the longitudinal direction of the mast 1 when said mast 1 is in the erect position,
- and the position of FIG. 5 in which the moving counterweight 19 has its longitudinal axis substantially in the continuation of the longitudinal axis of the mast 1 when said mast 1 is in the folded-down position.

The moving counterweight 19 can be operated by an actuator V2 such as a hydraulic ram for example, which connects said moving counterweight to the mast 1. V2 is itself incorporated into the control device 11 described previously (FIG. 3) and controlled by the aforementioned controller 15.

The controller 15 may for example control the actuator V2 in synchronism with the pivoting of the mast 1 so that the longitudinal axis of the counterweight remains substantially horizontal (see FIG. 5, 7, 8) or, more generally, so that:
- the center of gravity G of the moving counterweight 19 moves progressively away from the articulation 5 along the longitudinal axis of the mast (i.e., the projection of the center of gravity G on the longitudinal axis A of the mast moves progressively away from the articulation 5) when the mast 1 is pivoting into its folded-down position,
- and so that said center of gravity G moves progressively closer to the articulation 5 (i.e., the projection of the center of gravity G on the longitudinal axis A of the mast moves progressively toward the articulation 5) when the mast 1 is pivoting into its erect position.

More precisely, the movement of the counterweight 19 may be controlled according to the tilting of the mast 1, so that said movement compensates at least partially for the torque created by the mast 1, the nacelle 2, the rotor 3 and the turbine 4 when the mast 1 is inclined. The movements of the counterweight 19 are computed by the computer 12 and/or controller 15 based on the tilting of the mast 1, and the controller 15 then controls the ram V2 to actuate the counterweight so that it follows the necessary movements.

Further, the movement of the counterweight 19 could be controlled not only according to the tilting of the mast 1, but also according to the additional external forces which may be applied to the wind generator during the pivoting movements of the mast, for instance according to the efforts applied by the wind. Such additional external forces may be measured through the efforts applied to the ram V1 or computed from the outputs of various sensors (e.g. an anemometer—not shown in the drawings). In this case, the movements of the counterweight 19 are computed by the computer 12 and/or controller 15 based on the tilting of the mast 1 and on said additional external forces, and the controller 15 then controls the ram V2 to actuate the counterweight so that it follows the necessary movements.

When the mast 1 is in the folded-down position as depicted in FIG. 5, it may if appropriate rest on a support cradle 17 fixed to the ground, and the blades 4a of the turbine may also, if appropriate, rest on bearers 18 also fixed to the ground. These bearers 18 intended to accept the blades 4a of the turbine may if appropriate be made of a soft material or have bearing regions made of soft material, to avoid damage to the turbine blades 4a.

Advantageously, the pedestal 7 may be made in a depression 9 dug into the ground, this depression having a shape that substantially complements the shape of the wind generator once it is in the folded-down position, so that this wind generator offers little wind resistance and does not visually pollute the landscape when in the folded-down position.

The examples of numerical values given hereinabove in the first embodiment of the invention with regard to the ratios of length (height) or mass between the lower part and the upper part of the mast 1 remain valid in the second, third and fourth embodiments of the invention.

Figure 6:
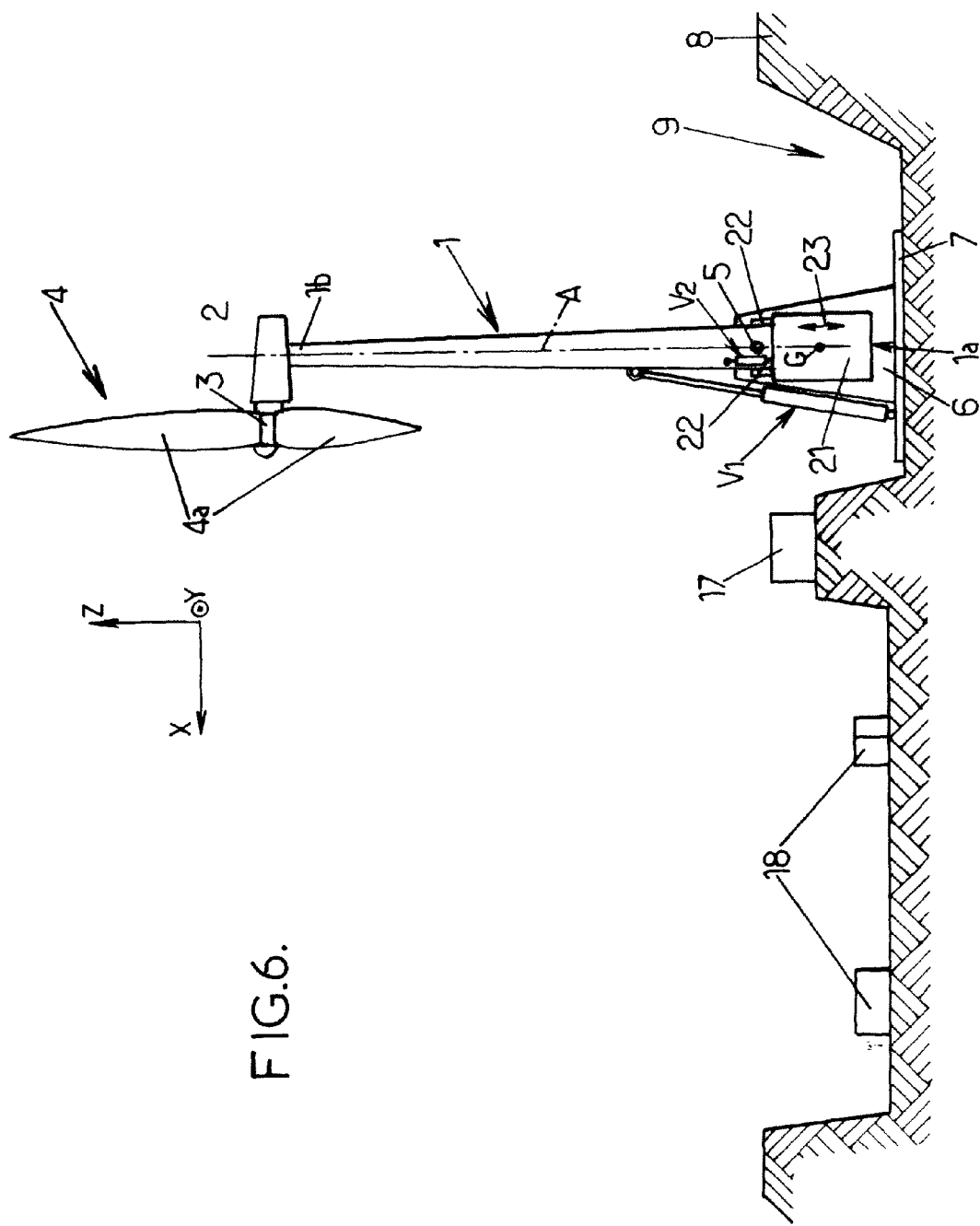
FIG. 6 is view similar to FIG. 2 in a second embodiment of the invention.

In the second embodiment depicted in FIG. 6, the counterweight 19 is replaced by a sliding counterweight which is made out of similar material as said counterweight 19 and which is slidingly mounted along the mast 1, for example along rails or slideways 22, in the direction of the double arrow 23 (parallel to the longitudinal axis A of the mast).

The moving counterweight 21 is controlled, for example, by a hydraulic ram V2, as in the first embodiment of the invention, so that it is moved in synchronism with the pivoting of the mast 1 so that the center of gravity G of the moving counterweight 21 progressively moves away from the articulation 5 along the longitudinal axis A of the mast when the mast 1 is pivoting into its folded-down position and, conversely, so that said center of gravity G moves progressively closer to the articulation 5 along the longitudinal axis A when the mast 1 is being erected.

The other elements of the wind generator and the operation of the wind generator (including the control of the counterweight) are identical or similar to those already described with regard to the first embodiment.

In the third embodiment, shown in FIGS. 7-11, the elements of the wind generator and operation thereof may be identical or similar to the first embodiment, except for the following differences, which all concern the lower portion of the mast 1.

Figure 7:
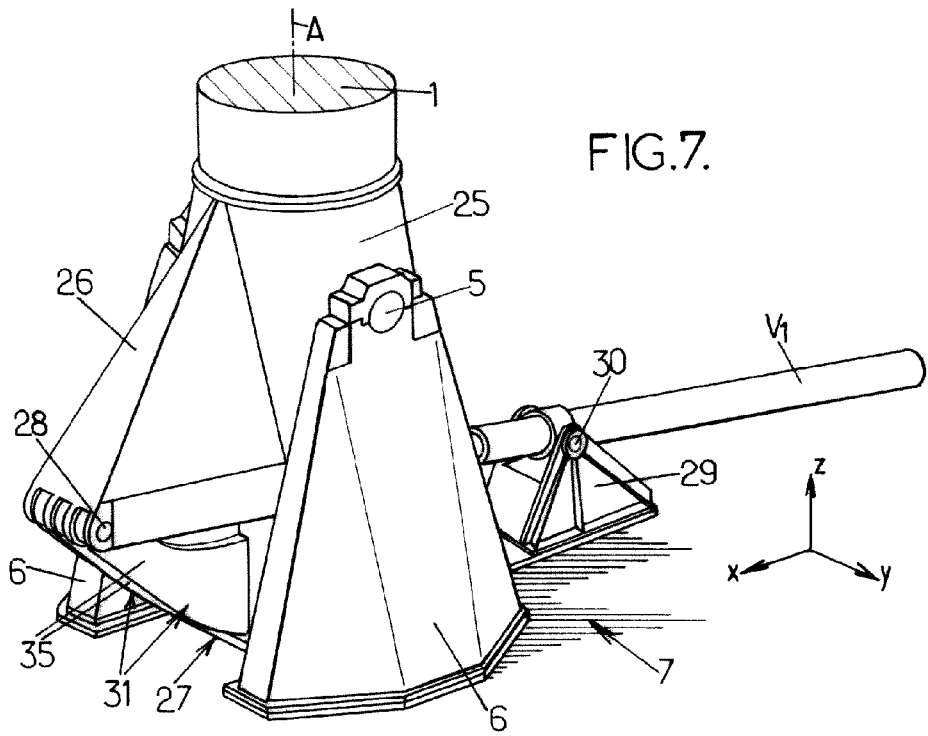
FIGS. 7 and 8 are perspective views, viewed in two different directions, of the lower part of the mast of a wind generator according to a third embodiment of the invention, in the erect position.
Figure 8:
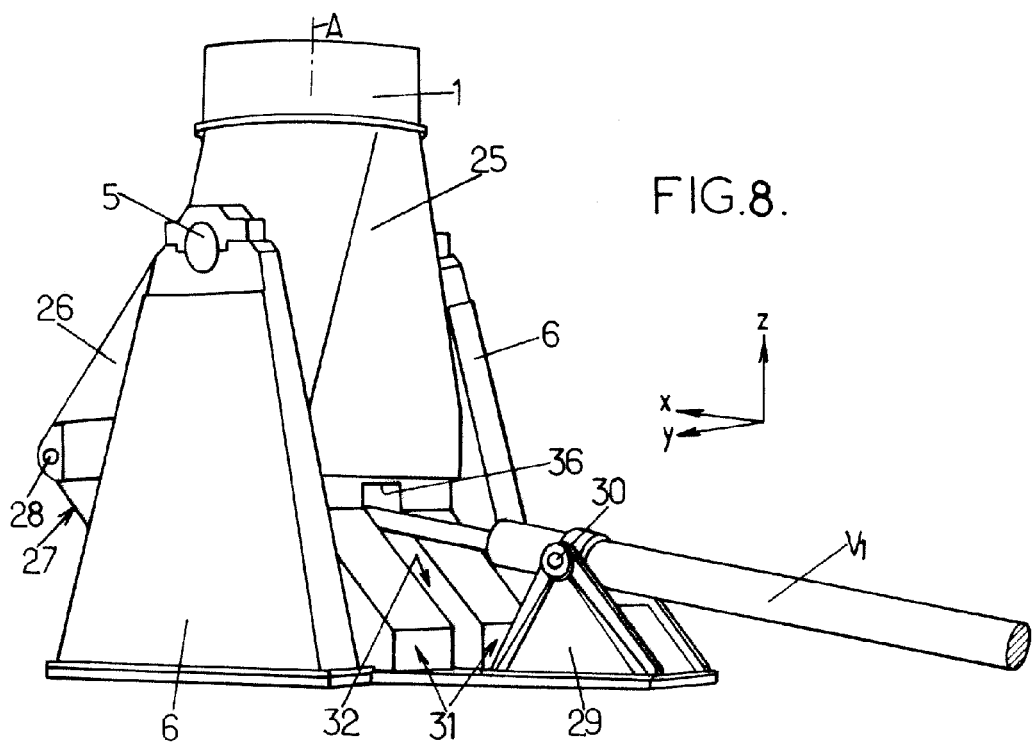

As shown in FIGS. 7-9, the lower portion 25 of the mast 1 may form a ballast which is fixed with regard to the mast and which may be made for instance of cast iron, concrete or other dense material as previously described for the first embodiment, said ballast having a center of gravity which is situated under the articulation 5.

The lower portion 25 of the mast may be extended opposite the ram V1, by a lateral extension 26. A movable counterweight 27, made out of similar materials as the counterweight 19 of the first embodiment, is pivotally mounted at the lower end of the extension 26, around a pivot 28.

The stem of the ram V1 may be pivotally connected to said pivot 28 and may extend under the ballast 25, toward a support 29 on which the cylinder of the ram V1 is pivotally mounted around an articulation 30. The support 29 is offset laterally from the mast 1 in the direction X, opposite the pivot 28.

The counterweight 27 may for instance include two vertical side plates 31 which extend parallel to the plane X,Z and which define a vertical slot 32 in-between. The ram V1 extends in said slot 32 up to the pivot 28.

The vertical side plates 31 may for instance each include a central main portion 33 extending in the X direction between:
a front portion 34, protruding horizontally toward the support 29,
and a rear arm 35 extending opposite the support 29 up to a rear end which is connected to the pivot 28.

The central main portions 33 of the side plates 31 are connected together by an upper bridge 36 extending between the side plates in the Y direction, and the hydraulic ram V2 may be connected for instance between said bridge 36 and the lower portion 25 of the mast, so as to control the pivoting of the counterweight 27 in a similar fashion as in the first embodiment. The ram V2 may be received for instance in a recess 40 hollowed out in the lower portion 25 of the mast.

In addition, the side plates 31 of the counterweight 27 may further include respectively two lower notches 37 which are disposed in mutual correspondence and which are adapted to engage by fitting on a corresponding transverse rib 38 belonging to the pedestal 7. This transverse rib may for instance be a concrete rib (specially when the pedestal 7 is itself made out of concrete) and may be covered by a metal profile 39 on which the notches 37 of the side plates may engage.

The wind generator according to the third embodiment may be operated as follows.

When the mast 1 is in the erect position as shown in FIGS. 7-9, the counterweight is pushed downward by the ram V2 so as to maintain the notches 37 of the counterweight engaged on the transverse rib 38, thereby locking the mast 1 in the erect position. The transverse rib 38 thus constitutes a fixed anchoring device with which the counterweight 27 cooperates by fitting engagement when the mast 1 is erect, in order to lock said mast in the erect position.

When the mast 1 has to be folded down, the ram V2 initially raises the counterweight 27 so that the notches 37 of the counterweight disengage from the transverse rib 38, the ram V1 pivots the mast 1 downward as shown in FIG. 10, until the mast 1 is completely folded down in the horizontal position as shown in FIG. 11.

During this process, the ram V2 is controlled so as to pivot the counterweight 27 during the pivoting of the mast, to move progressively the center of gravity G of the counterweight 27 away from the articulation 5 along the longitudinal axis A of the mast when the mast 1 is pivoting downward toward the folded down position. Thus, the counterweight 27 is pivoted in its position farthest from the articulation 5 when the mast is in the folded down position (FIG. 11).

When the mast 1 is raised again, the counterweight 27 is progressively pivoted toward the lower portion 25 of the mast, i.e. toward a position where the center of gravity G is closest to the articulation 5.

The control of the counterweight is performed in a similar manner as in the first embodiment.

Figure 12:
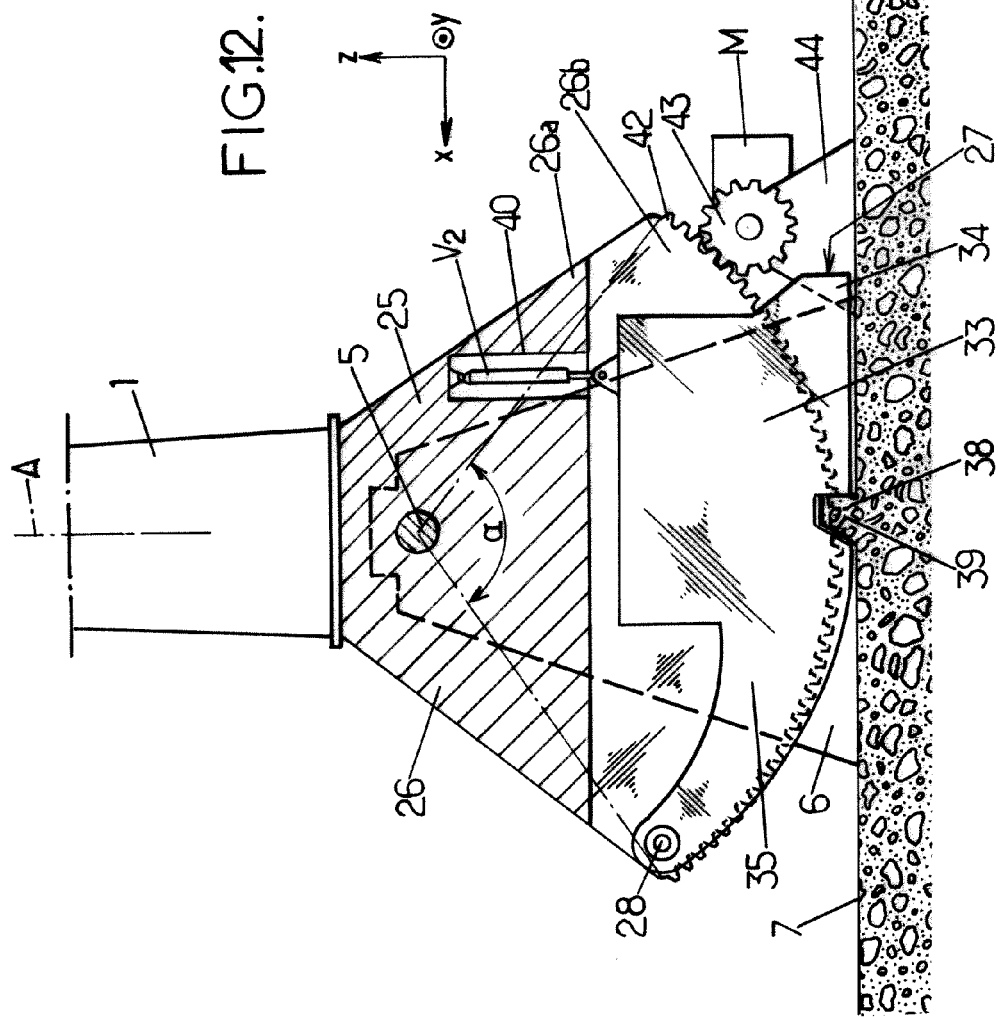
FIG. 12 is a view similar to FIG. 9, in a fourth embodiment of the invention.

In the fourth embodiment, shown in FIG. 12, the elements of the wind generator and operation thereof may be identical or similar to the third embodiment, except for the following differences.

The lower portion 25 of the mast is extended laterally not only by the extension 26, but also by a further extension 26a opposite to the extension 26 and symmetrical to extension 26. The lower portion 25 of the mast is also extended downward, on all the lateral extent of extension 26 to extension 26a, by a vertical side plate 42. The side plate 42 may be disposed side to side with the counterweight 27.

The side plate 42 has a lower edge which is circular in shape and centered on the articulation 5. This lower edge forms a circular rack 42, centered on articulation 5 and extending on an angle α measured from articulation 5. The angle α may be for instance, at least 90°, for instance around 100°.

The transverse rib 38 and metal profile 39 are interrupted in correspondence with the circular rack 42 to avoid interference therebetween, or alternately, the circular rack may be situated above the transverse rib 38 and profile 39.

A pinion 43 meshes with the circular rack 42, and this pinion 43, which is rotatively mounted on a support 44 borne by the pedestal 7, is controlled by a motor and gear M, itself controlled by the controller 15. In this embodiment, the ram V1 is omitted, the pivoting of the mast being obtained by rotating the pinion 43 through the motor M.

Figure 13:
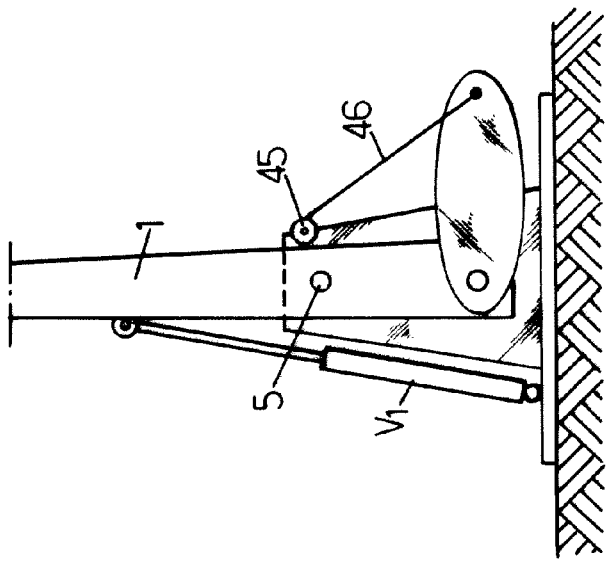
FIG. 13 shows a variant of the actuator of the counterweight in the first embodiment.

In all embodiments described hereinabove, the hydraulic ram V2 could, if appropriate, be replaced by a winch 45 associated with a cable 45, the winch being fixed for example to the mast 1 and the free end of the cable fixed to the moving counterweight 19, 21, 27 as shown in FIG. 13 in the case of the first embodiment (or conversely, the winch could be fixed to the moving counterweight and the free end of the cable could be fixed to the mast 1).

Besides, in a variant of the fourth embodiment, the counterweight 27 could be fixed with regard to the mast 1 instead of being pivotally mounted at the lower end of the mast 1, in which case the ram V2 and the transverse rib 38 and profile 39 would be omitted.

The invention claimed is:

1. A wind generator comprising:
    a mast extending along a longitudinal axis between a lower end and an upper end, said mast being pivotally mounted as a whole on a fixed basis through an articulation between a substantially vertical erect position and a substantially horizontal folded-down position, the articulation being positioned between the lower and upper ends of the mast, the mast comprising a lower part, situated between the articulation and the lower end and an upper part situated between the articulation and the upper end,
    a nacelle borne by the upper end of the mast, this nacelle comprising a rotor bearing a turbine,
    a counterweight pivotally mounted to the lower part of the mast, said counterweight counterweighting the nacelle and the upper part of the mast,
    at least one main actuator connected to the mast and adapted to make said mast pivot between the erect position and the folded-down position, wherein the wind generator comprises a control device including at least one additional actuator connecting the moving counterweight to the mast and adapted to move the counterweight so that a center of gravity of the counterweight is moved toward and away from said articulation along the longitudinal axis of the mast and wherein the control device moves the counterweight as a function of the pivoting of the mast so that said center of gravity is further away from the articulation when the mast is in the folded-down position and closer to the articulation when the mast is in the erect position.

2. Wind generator according to claim 1, wherein the control device is adapted to move the counterweight in synchronism with the pivoting of the mast so as to move said center of gravity progressively:
    away from the articulation as the mast is pivoting into the folded-down position,
    and closer to the articulation as the mast is pivoting into the erect position.

3. Wind generator according to claim 2, wherein the control device is adapted to move the counterweight as a function of a tilt angle of the mast so as to balance at least partially a torque applied to said mast by gravity during pivoting of the mast.

4. Wind generator according to claim 3, wherein the control device is adapted to move the counterweight as a function of an external force applied to the mast by the wind so as to balance at least partially a torque applied to said mast by said external force during pivoting of the mast.

5. Wind generator according to claim 1, wherein the additional actuator is chosen from:
    a hydraulic ram; and
    a winch associated with a cable.

6. Wind generator according to claim 1, wherein said counterweight comprises a mass of a dense material selected from concrete, cast iron, clinker and sand.

7. Wind generator according to claim 1, wherein the lower part of the mast has a first height and the upper part of the mast has a second height, the first height ranging between 10% and 50% of the second height.

8. Wind generator according to claim 1, wherein the lower part of the mast has a first mass, the upper part of the mast and the nacelle together having a second mass, the first mass ranging between 30% and 300% of the second mass.

9. Wind generator according to claim 1, wherein the main actuator includes a hydraulic ram.

10. Wind generator according to claim 1, wherein the main actuator includes a motor actuating a pinion which meshes with a circular rack centered on the articulation, one of said pinion and rack being connected to the mast.

11. Wind generator according to claim 1, wherein the counterweight is adapted to engage with a fixed anchoring device when the mast is in the erect position so as to lock the mast in said erect position, and the control mechanism is adapted to selectively engage and disengage the counterweight from the fixed anchoring device.

12. Wind generator according to claim 11, wherein the counterweight is shaped to cooperate by fitting with said fixed anchoring device in a substantially vertical direction.

* * * * *